SIGNAL MIXING CIRCUITS

Filed Dec. 28, 1946 2 SHEETS--SHEET 1

INVENTOR.
RAYMOND C. GOERTZ
BY
Herbert H. Thompson
his ATTORNEY.

Oct. 14, 1952 R. C. GOERTZ 2,614,237

SIGNAL MIXING CIRCUITS

Filed Dec. 28, 1946 2 SHEETS—SHEET 2

INVENTOR
RAYMOND C. GOERTZ
BY
Herbert H. Thompson
his ATTORNEY.

Patented Oct. 14, 1952 2,614,237

UNITED STATES PATENT OFFICE 2,614,237

SIGNAL MIXING CIRCUITS

Raymond C. Goertz, Hempstead, N. Y., assignor to The Sperry Corporation, a corporation of Delaware Application December 28, 1946, Serial No. 718,966

7 Claims. (Cl. 318—30)

This invention relates to signal mixing circuits, and, in particular, to signal mixing circuits especially adapted for use in a servomotor system wherein fine and coarse error signals are employed in the control of the servomotor.

More particularly, the instant invention relates to servomotor systems in which a fine and coarse signal voltage mixing circuit is provided having an output for accurately controlling the servomotor in respect to a reference member, the mixing circuit including means for transferring control of the output from the fine input to the coarse input whenever a disagreement exceeding a predetermined amount exists between the position of the object driven by the servomotor and the position of the reference device.

It is an object of this invention to provide an electrical circuit for producing an output voltage mainly corresponding to either the fine or the coarse input, the selection depending upon the extent of disagreement existing between the object driven by the output and the reference device.

Another object resides in providing a mixing and controlling circuit for fine and coarse signal voltages, comprising electronic means having an output controlled by the fine signal voltage to the exclusion of the coarse signal voltage under one set of conditions, and having the output controlled by the coarse signal voltage to the exclusion of the fine signal voltage under another set of conditions.

A further object is to provide a mixing circuit including high impedances in circuit with both the fine and the coarse signal inputs, one of said impedances including electronic means for affording isolation of one input signal in the operating region of the other, and also providing smooth transition from fine to coarse input and vice versa, thereinbetween.

More particularly, an object is to provide a mixing circuit including a high impedance in series with the fine signal input, and an electronic circuit including a diode electron tube, in circuit with the coarse error signal. Said diode serving to block the coarse error signal from control of the output by presenting an infinite impedance to said coarse error signal in the operating region of the fine error signal, and said diode presenting a relatively small impedance to said coarse error signal in the operating region of said coarse error signal whereby the impedance in circuit with said fine error signal, being relatively large, effectively blocks said fine error signal in the operating region of said coarse error signal.

The invention also relates to the novel features or principles of the instrumentalities described herein, whether or not such are used for the stated objects, or in the stated fields or combinations.

Other objects and advantages will become apparent from the specification, taken in connection with the accompanying drawings wherein, Fig. 1 is a schematic diagram of a servo system embodying a simplified version of the mixing circuit of the instant invention;

Figures 1, 2, 3:
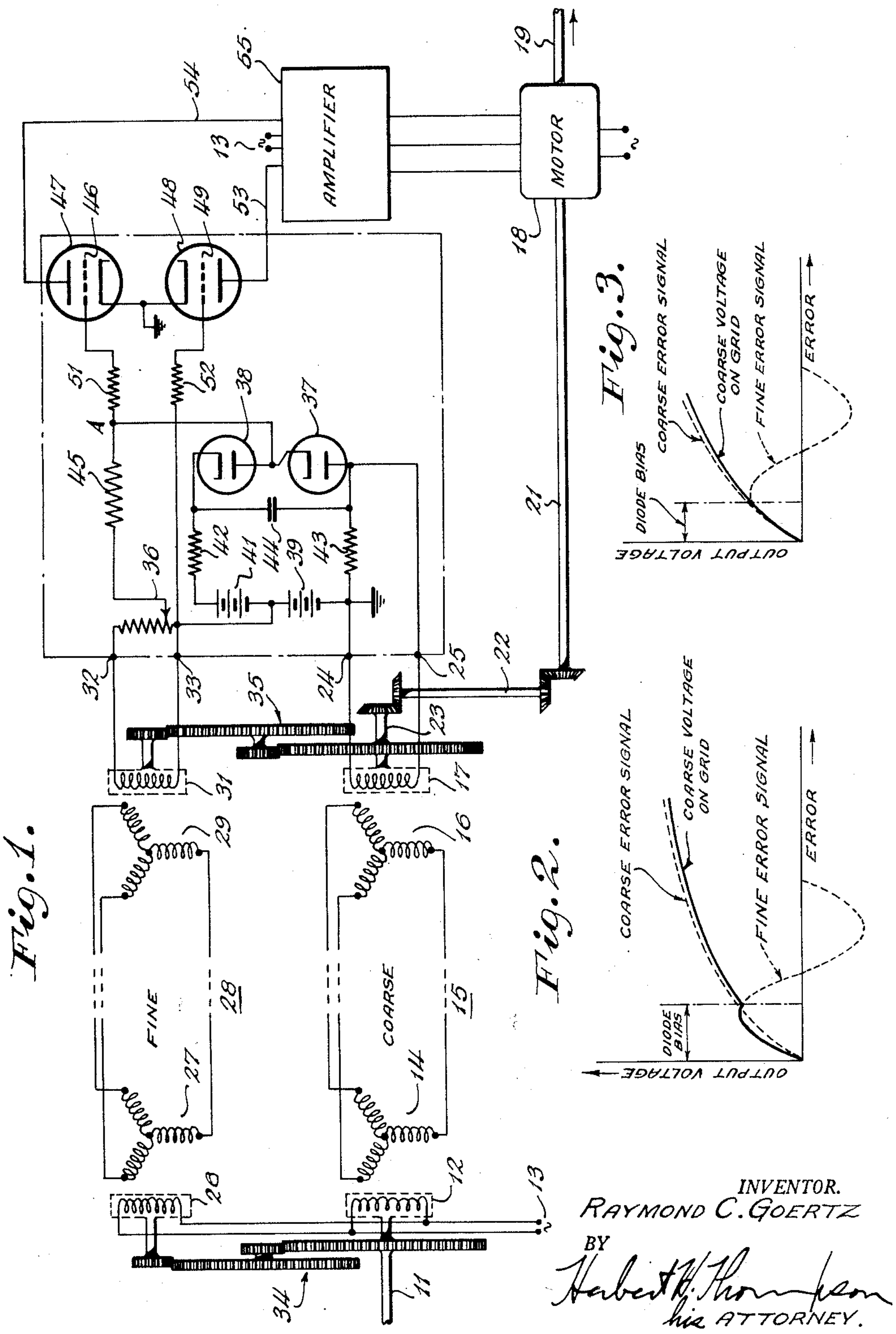
Fig. 2 is a graph illustrating the relationship between fine and coarse signals and the output.
Fig. 3 is a graph illustrating an alternative relationship between fine and coarse signals and the output.

Referring now to the drawings, Fig. 1 illustrates the instant invention as embodied in a simplified mixing circuit. In Fig. 1, fine and coarse signals are produced in response to angular displacement of a reference device which, though not shown, may be operatively connected to cause rotation of the shaft 11. Rotatable with the input shaft 11, is a rotor 12, which is energized by an alternating current source 13, thereby inducing in the transmitter 14 an electromagnetic field which will assume a position dependent upon the angular position of the rotor 12. This electromagnetic field is reproduced in direction in the receiver unit 16, located at some position removed from the transmitter unit 14 and connected thereto through leads 15. Rotor 17 is arranged to rotate within the field of the stator of receiver unit 16 and is positioned in an angular sense by the motor 18 in accordance with the position of the load shaft 19 as transmitted through shafts 21, 22 and 23 and associated gearing.

As the object of the entire system is to energize the motor 18 to drive the load shaft 19 into positional agreement with the reference device that is operatively associated with the input shaft 11, upon the occurrence of a disagreement between the angular position of the shaft 19 and the angular position of the reference shaft 11, a corresponding angular discrepancy or asynchronism will be evidenced between the rotor 17 which was positioned by the motor 18, and the rotor 12 which was positioned by the reference device and the input shaft 11. Inasmuch as the angular position of rotor 12 is transmitted to the receiver 16, any disagreement existing between the rotor 17 and the position of the field created by the receiver 16 will serve to create an output signal across the point 24, 25 that is dependent, in amplitude, upon the extent of disagreement existent between the load shaft 19 and the reference shaft 11, and, in phase sense, upon the direction of such disagreement, and this signal is hereinafter referred to as the coarse error signal, or the coarse input signal.

In order to provide greater sensitivity or closer synchronization in the region of small angular disagreements between shaft 19 and the reference shaft 11, a fine error signal or fine input signal is produced in a manner well known in the art. The electrical circuit for producing a fine error signal is substantially the same as that for producing the coarse error signal, and in this instance includes the rotor 26, transmitter 27, transmission lines 28, and a receiver unit 29 including rotor 31. The fine error signal appears across points 32, 33. As is commonly provided in similar fine and coarse systems, rotation of rotor 26 is responsive to rotation of the input shaft 11, but the gear train 34, to which rotor 26, is operatively connected, produces a rotation of rotor 26 which is some multiple of the rotation of the input shaft, and the ratio of 36:1 is sometimes chosen. In order to maintain the angular motion of the rotor 31 in the same ratio with respect to its driving source, or shaft 23, the gear train 35 is provided.

With the apparatus above described, on the occurrence of an angular discrepancy between the load shaft 19 and the reference or input shaft 11, two error signals will be produced. One of these error signals will appear as an error input signal between the points 24 and 25 and the other error signal will appear as an error input signal between the points 32 and 33. Furthermore, inasmuch as the A. C. source 13 is provided to energize both of the rotors 12 and 26, both of the error input signals will be of the same frequency, but due to the ratio of angular displacement of the fine error signal generator as compared to the coarse error signal generator, the cycle of the envelope of the fine error input signal appearing between points 32 and 33 will bear a ratio of 36:1 (or any other predetermined ratio), to the cycle of the envelope of the coarse error signal appearing between points 24 and 25. Fig. 2, in illustrating this relationship, provides a first curve labelled "Fine Error Signal," and a second curve labelled "Coarse Error Signal," and shows the relationship between the outputs of the signal generators as the outputs vary in accordance with the actual displacement or error. Actually the fine error signal will ordinarily have an amplitude much greater than that shown by the curve of Fig. 2, but in order to provide a system wherein the rise of voltage from the fine error signal is substantially the same as for the coarse, a potentiometer 36 is inserted across the fine input signal. Inasmuch as it is desirable to block the coarse error signal from controlling the servomotor 18 for small values of actual error which may be considered as the operating region of the fine error signal (which, in the case illustrated in Fig. 2, has been selected to be approximately zero to plus or minus two degrees of reference error), a pair of diode electron tubes 37 and 38 are provided in circuit with the coarse error input. When non-conducting, diodes offer substantially infinite impedance, but when conduction takes place, the impedance drops to the order of a few hundred ohms. Preferably, each of the diodes is biased from some suitable voltage source such, for example, as from the batteries 39 and 41 of preferably equal voltages, in a non-conducting direction. The balancing resistors 42 and 43, of relatively low impedance value, and the condenser 44 serve to assist in providing full phase operation across the diodes 37 and 38, completing the blocking circuit for the coarse signal input.

Resistor 45 of relatively high impedance value (for example, it may be in the order of ten times as great as resistor 42 and 43) is also much higher than the impedance of the diode when conducting, and is connected in series with the fine error signal. The resistor 45 is not of so great a value as to affect the transmission of the fine error signal under the condition presented when the coarse error signal is blocked by the diodes 37 and 38, but due to its relatively large size as compared to the resistance in the coarse error signal circuit, when the coarse error signal overcomes the bias due to sources 39 and 41, then resistor 45 serves to virtually block the fine error signal from effecting the operation of the control grid 46 of tube 47 which, as will presently be disclosed, in turn controls the operation of the servomotor 18.

From the foregoing, it may be seen that each of the grids 46 and 49 of tubes 47 and 48 connected through grid resistors 51 and 52 are at the same D. C. level, with reference to ground, that level being dependent upon the value of the D. C. source 39. However, grid 46 alone receives the A. C. signals, and the voltage at point A controls the grid 46 and thereby, the space discharge path of the tube 47. Lines 53 and 54 connect the output from tubes 47 and 48 to an ordinary phase sensitive amplifier 55 which in turn controls the rotation of the motors 18 in a manner well known in the art.

The graph of Fig. 2 illustrates the type of output produced by the instant mixing circuit, particularly showing the transition of control from fine to coarse error signal when the bias on the diodes has been overcome. The solid line represents the signal that would appear at point A of the schematic of Fig. 1. The slight difference between the graph of the coarse error signal, and the graph of the coarse voltage on the grid (or point A) may be attributed to the total small impedance drop including that across the diodes 38 and 37 when conducting.

Fig. 3 illustrates the relative signal values when the rate of increase of the fine error signal has been adjusted, by potentiometer 36, to a value more nearly corresponding to the rate of increase of the coarse error signal, for that region, to assist in producing a smooth transition from fine to coarse at the point where the diode bias, which up to this point has served to block the coarse, is overcome.

While under certain conditions it may be desirable to have a very smooth transition from fine to coarse error signal, in certain applications it may be more desirable to extend the region of fine error signal operation at the sacrifice of maintaining a smooth curve at the transition point. In any event, if the saturation point of the amplifier is reached while the output is still responsive to the fine error signal, the transition from fine to coarse error signal at the point at which the impedance due to the diodes is overcome by the coarse signal, will also be smooth, regardless of the rate of increase of the fine or the coarse error signal.

Figure 4:
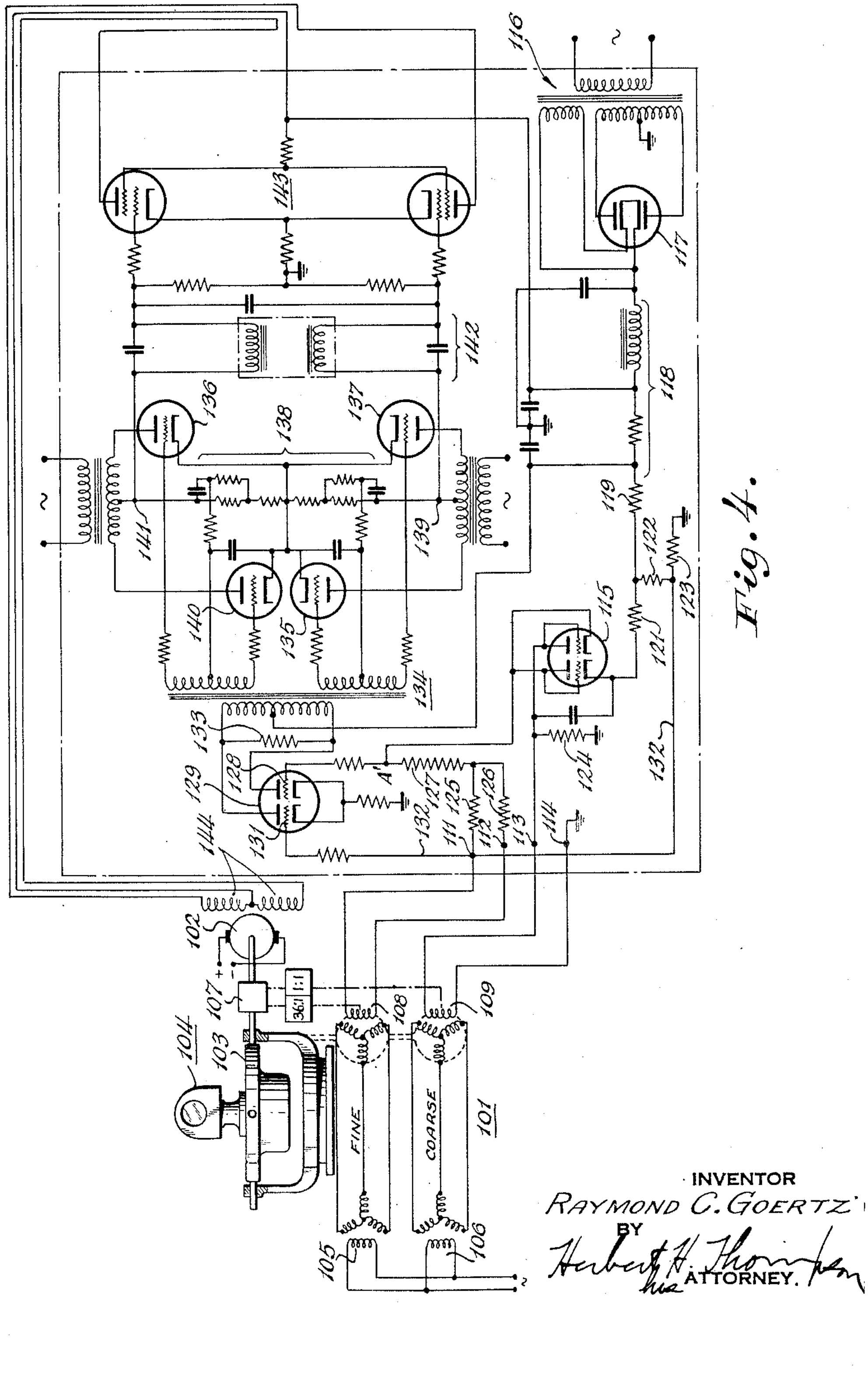
Fig. 4 is a schematic diagram showing a complete circuit for a servo system embodying a preferred form of the instant invention.

Fig. 4 illustrates a complete circuit embodying the general concepts set forth in the simplified version illustrated in connection with Fig. 1. In Fig. 4, a fine and coarse error signal may be evolved with equipment similar to that hereinbefore described in detail for obtaining fine and coarse signals and is indicated generally as 101. In the instant embodiment, the servomotor 102 is provided to stabilize the platform 103, supporting a scanner device 104, either in roll or pitch, in accordance with a reference such as a gyro vertical (not shown) which operates the rotors 105 and 106 of the fine and coarse system 101. A gear reduction mechanism 107 is provided for interconnecting the servomotor 102 with the platform 103, and includes a gear train for maintaining a predetermined ratio, such as 36:1, for the receiver rotors 108 and 109 of the fine and coarse system 101. Thus, if a discrepancy occurs between the angular position of the rotors 108 and 105, or 109 and 106, a fine error signal will appear across input points 111 and 112, and a coarse error signal will appear across input points 113 and 114.

As in the case involving the simplified schematic of Fig. 1, a pair of diodes, herein appearing as the duo-diode 115 is provided for blocking the coarse input signal under the condition of a small error signal, say two degrees. A bias for tube 115 is derived from a voltage divider connected with rectifier tube 117 which is energized from the power transformer 116. The interconnecting circuit 118 includes filter circuits as shown for smoothing the rectified voltage. The voltage divider includes resistors 119, 122 and 123, and resistors 121 and 124 serve to provide equal biases in a non-conducting direction on both halves of the diode 115. Thus, the coarse error voltage is blocked by the high impedance provided by the diode 115 until such time as the bias obtained through the voltage-dropping circuit is overcome by the coarse error signal.

In circuit with the fine error signal is a pair of voltage-dropping resistors 125 and 126 connected with a relatively high impedance such as resistor 127. The high impedance of resistor 127 has no material effect during the time when the coarse error signal is blocked, but once the coarse error signal becomes large enough to overcome the bias, the impedance in circuit with the coarse error signal is so small as compared to the high impedance offered by resistor 127, that the operation of the grid 128 is controlled by the coarse error signal in a manner similar to the operation described in connection with the simplified schematic of Fig. 1. The other grid 131 of the tube 129 is maintained at a constant D. C. level above ground, being tied into the voltage-dropping circuit through line 132 to the high side of resistor 123.

The output of tube 129, being governed effectively either by the fine or the coarse error signal in the manner described, will then appear across the resistor 133, connected across the primary of the coupling transformer 134. The secondary of the coupling transformer is then fed to a full wave, phase sensitive rectifier, including tubes 135 and 140, and tubes 136 and 137 in a circuit arrangement well known to the art, and rate-taking circuits 138, for producing a signal component in the output of the rectifier proportional to the rate of change of the error signal input, is also included. The output from this rectifier appears across points 139 and 141 as a unidirectional voltage, varying in magnitude with the amplitude of the input signal and of a polarity dependent upon the phase sense of the input signal. The rate circuits modify the foregoing by producing a rate component in the rectifier outputs. A filter 142 and a D. C. power output stage 143 are also provided, the D. C. amplifier 143 being connected differentially to the control field 144 of the constant armature current motor 102.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a system for mixing two voltages, an electrical circuit including an electron tube having a control electrode and two inputs adapted to be connected to the two sources of voltage to be mixed, means including a relatively high impedance for connecting one of said inputs to said control electrode, means including a pair of diode electron tubes and a source of bias potential connected therewith, said tubes having space discharge paths connected for full phase operation of said applied voltage for blocking the voltage supplied thereto below a predetermined value but passing voltages in excess thereof to its output, and means for connecting the output of said last mentioned means to said control electrode between it and said high impedance, the impedance offered by said pair of diodes being infinite under blocking condition but low as compared to the value of said impedance connecting means when in a conducting condition.

2. In a servo system, fine and coarse transmission systems, a servomotor connected for control by the voltage outputs of said fine and coarse systems, and a circuit for mixing the fine and coarse error voltage outputs of said systems, said circuit comprising an electron tube having a control electrode, a pair of inputs adapted to be connected to two sources of voltage to be mixed, means including a relatively high impedance for connecting one of said inputs to said control electrode, means including a diode electron tube and a source of bias potential connected therewith, said tube being connected with the other input for blocking the voltage supplied thereto below a predetermined value but passing voltages in excess thereof to its output, and means for connecting the output of said last-mentioned means to said control electrode between it and said high impedance.

3. In a servo system, fine and coarse transmission systems, a servomotor connected for control by the voltage outputs of said fine and coarse systems, and a circuit for mixing the fine and coarse error voltage outputs of said systems, said circuit comprising an electron tube having a control electrode, a pair of inputs adapted to be connected to two sources of voltage to be mixed, means including a relatively high impedance for connecting one of said inputs to said control electrode, means including a pair of diode electron tubes having space discharge paths connected for full phase operation of said applied voltage for blocking the voltage supplied thereto below a predetermined value but passing voltages in excess thereof to its output, a source of bias potential connected to both of said diode electron tubes, and means for connecting the output of said last-mentioned means to said control electrode between it and said high impedance, the impedance offered by said pairs of diodes being infinite under blocking condition but low as compared to the value of said impedance connecting means when in a conducting condition.

4. In a servo system fine and coarse transmission systems, a servomotor connected for control by the voltage outputs of said fine and coarse systems, and a circuit for mixing the fine and coarse error voltage outputs of said systems, said circuit comprising an electron tube having a control electrode, a pair of inputs adapted to be connected to two sources of voltage to be mixed, means including a relatively high impedance for connecting one of said inputs to said control electrode, means including a pair of diode electron tubes having a fixed bias for blocking the voltage supplied thereto below a predetermined value, but passing voltages in excess thereof to its output, and means for connecting the output of said last-mentioned means to said control electrode between it and said high impedance, the impedance of said pair of diodes being infinite when in blocking condition but low as compared to the impedance of said impedance connecting means when in a conducting condition.

5. In a system for mixing fine and coarse signal voltages and having an electrical circuit including an electron tube with a control electrode and two inputs adapted to be connected to two sources of voltage to be mixed, and means including relatively high impedance for connecting one of said inputs to said control electrode; the combination therewith of means connected with the other input for blocking the voltage supply thereto below a predetermined value but passing voltages in excess thereof to its output, the output being connected to said control electrode, said blocking means comprising a pair of diodes connected in series relationship, one output line connected at a point joining said diodes, a condenser across both of said diodes, a pair of biasing voltage sources connected to bias said diodes in a non-conducting direction, a pair of balancing resistors in series with each of said biasing sources, and a second output line connected at a point interconnecting said biasing voltages.

6. In a system for mixing fine and coarse signal voltages and having an electrical circuit including an electron tube with a control electrode and two inputs adapted to be connected to two sources of voltage to be mixed, and means including relatively high impedance for connecting one of said inputs to said control electrode; the combination therewith of means connected with the other input for blocking the voltage supply thereto below a predetermined value but passing voltages in excess thereof to its output, the output being connected to said control electrode; said blocking means comprising a pair of diodes connected in series relationship, one output line connected to a point joining said diodes, a pair of voltage sources connected to bias said diodes, and a resistance-capacitance network connecting said diodes with said biasing source to provide thereby full phase operation of said blocking circuit.

7. In a system for mixing two voltages, amplifying means adapted to be connected to the two sources of voltage to be mixed, means including a relatively high impedance for connecting said amplifying means with a first of said two voltages, means comprising a diode electron tube and a source of bias potential connected therewith, said tube being connected with the second of said two voltages and being operable to block the current supplied thereto below a predetermined value but to pass a current in excess thereof to its output, and means for connecting the output of said last-mentioned means to said amplifying means between it and said high impedance.

RAYMOND C. GOERTZ.

REFERENCES CITED

The following references are of record in the file of this patent:

UNITED STATES PATENTS

| Number | Name | Date |
|---|---|---|
| 2,324,809 | Edwards | July 29, 1944 |
| 2,409,970 | Agins | Oct. 22, 1946 |
| 2,414,384 | Moseley | Jan. 14, 1947 |
| 2,455,364 | Hays Jr. | Dec. 7, 1948 |